May 12. 1925.

T. C. ROBERTS

APPARATUS FOR MOLDING ARTICLES

Filed July 9, 1919

Inventor
T. C. Roberts

Attorney
W. Laird Goldsborough

Fig. 2

Patented May 12, 1925.

1,537,697

UNITED STATES PATENT OFFICE.

THEODORE C. ROBERTS, OF BRIDGEPORT, CONNECTICUT, ASSIGNOR, BY MESNE ASSIGNMENTS, TO COLUMBIA PHONOGRAPH COMPANY, INC., A CORPORATION OF NEW YORK.

APPARATUS FOR MOLDING ARTICLES.

Application filed July 9, 1919. Serial No. 309,702.

*To all whom it may concern:*

Be it known that I, THEODORE C. ROBERTS, a citizen of the United States, and residing at Bridgeport, county of Fairfield, and State of Connecticut, have invented certain new and useful Improvements in Apparatus for Molding Articles, of which the following is a full, clear, and exact description.

The invention which constitutes the subject matter of this application resides in an automatic machine which is primarily designed for the manufacture, from plastic or other suitable material, of certain finished articles, and which, although capable of molding many kindred devices, is herein described mainly as an apparatus for the specific purpose of manufacturing sound records.

The machine in question differs from others in the prior art by the fact that the various steps in the process of manufacture of the articles in question are performed successively, there being what may be called a plurality of stations at which the treatment of the material in its different stages is performed simultaneously. In other words, there is provided a conveyer, containing a plurality of presses, which is moved or rotated either continuously or intermittently with a result that a certain treatment is performed at each "station," or during each stage of its movement. In this way, as all of the pressing units are provided or supplied by the material from which the record is manufactured, a different stage of the work is being simultaneously carried on at each station, and then, by the movement or rotation of the conveyer the material is advanced to the next station for the next succeeding operation or treatment, or expelled or removed from the machine as the case may be.

The machine in question moreover, differs from others in the prior art by the fact that there is a correlation between the treatment performed at one station and that performed at the next succeeding station. That is, in the making of such articles as sound records and the like, if the first operation involves the pressing of the plastic material, and a succeeding operation involves the cooling and setting of the material, the latter will be one requiring a considerable length of time as compared with the former. But to correlate the two the cooling and setting of the material is prolonged until the proper cast has taken place.

A machine so organized as to divide up the work in stages is capable of turning out a great many records in a short space of time, but as will be apparent from the foregoing it is essential that the arrangement be such that there is maintained between the treatment performed at the successive stations a certain definite relation. Furthermore a machine so organized enables the employment in the manufacture of records of a very large proportion of unskilled labor as the work of preparing and feeding the material to and the removal of the finished product from the machine is likewise divided up, thereby dispensing entirely with the time that the skilled pressman, in the use of the present type of machine, necessarily consumes in turning on and off the valves for heating and cooling, and in eliminating the loss of time which occurs as he waits for the successive steps in the operation of the record pressing machine to take place.

The objects of my invention may be accomplished by the use of the apparatus illustrated in the accompanying drawings of the invention.

Referring to the construction illustrated in Figs. 1 to 7 inclusive the record-pressing machine in general comprises a plurality of presses, numbered from 1 to 12 inclusive, suitably fixed to a conveyer 13; a track, in the form of supporting wheels 14 pivoted to suitable brackets 15, upon which the conveyer, in the embodiment illustrated, is rotatably supported; a base 16 upon which the track is mounted; a plurality of cam-rails 17, 18 and 19 fixed to the base 16 provided with inclinations or cam surfaces; mechanism designed to actuate the conveyer; and means co-operating with the cam-rails for operating the pressing units and for the control of the flow of fluid necessarily utilized in the operation of the presses to perform the other functions incident to the operation of the machine.

Figure 1:
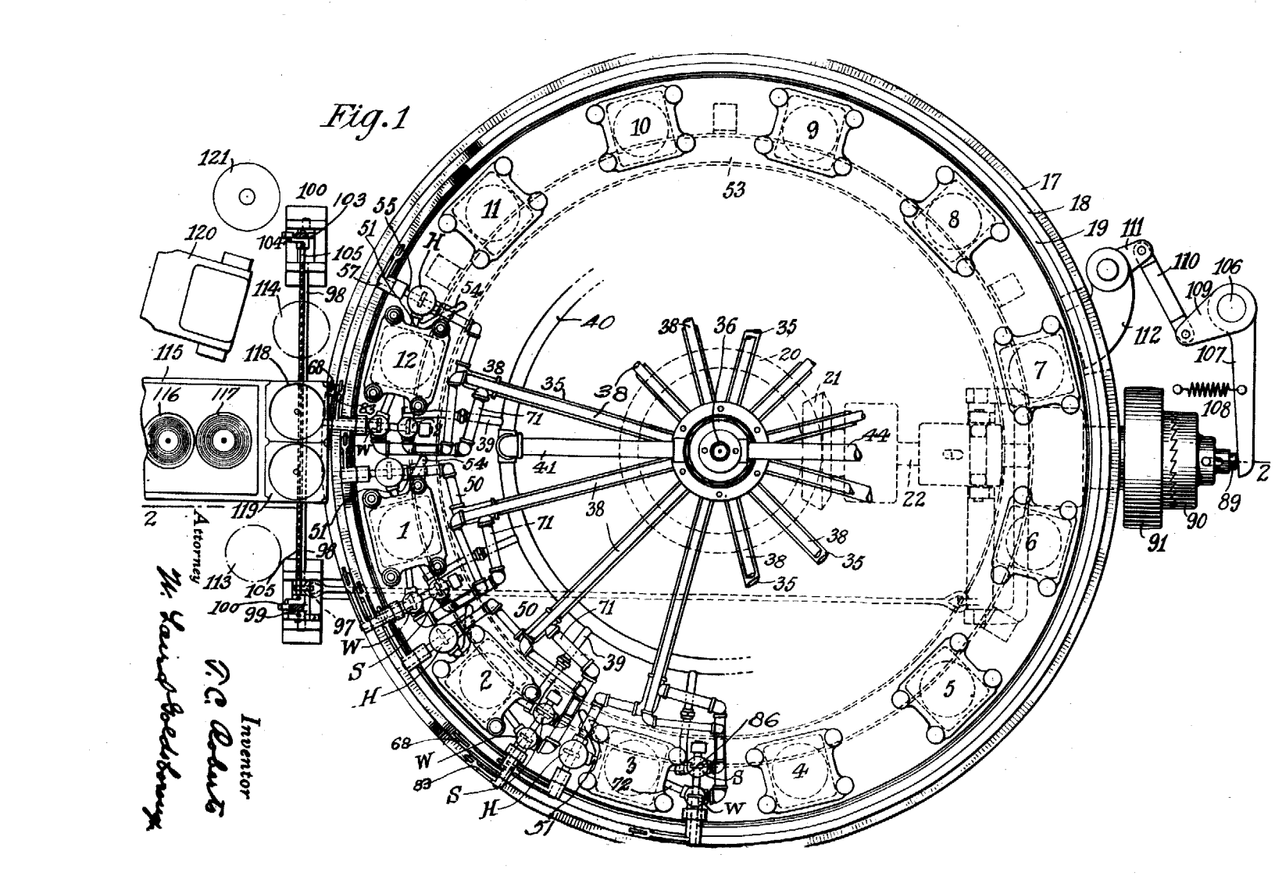
Fig. 1 illustrates a top plan view of the record pressing machine, some of the parts having been omitted for the sake of clearness.
Figure 2:
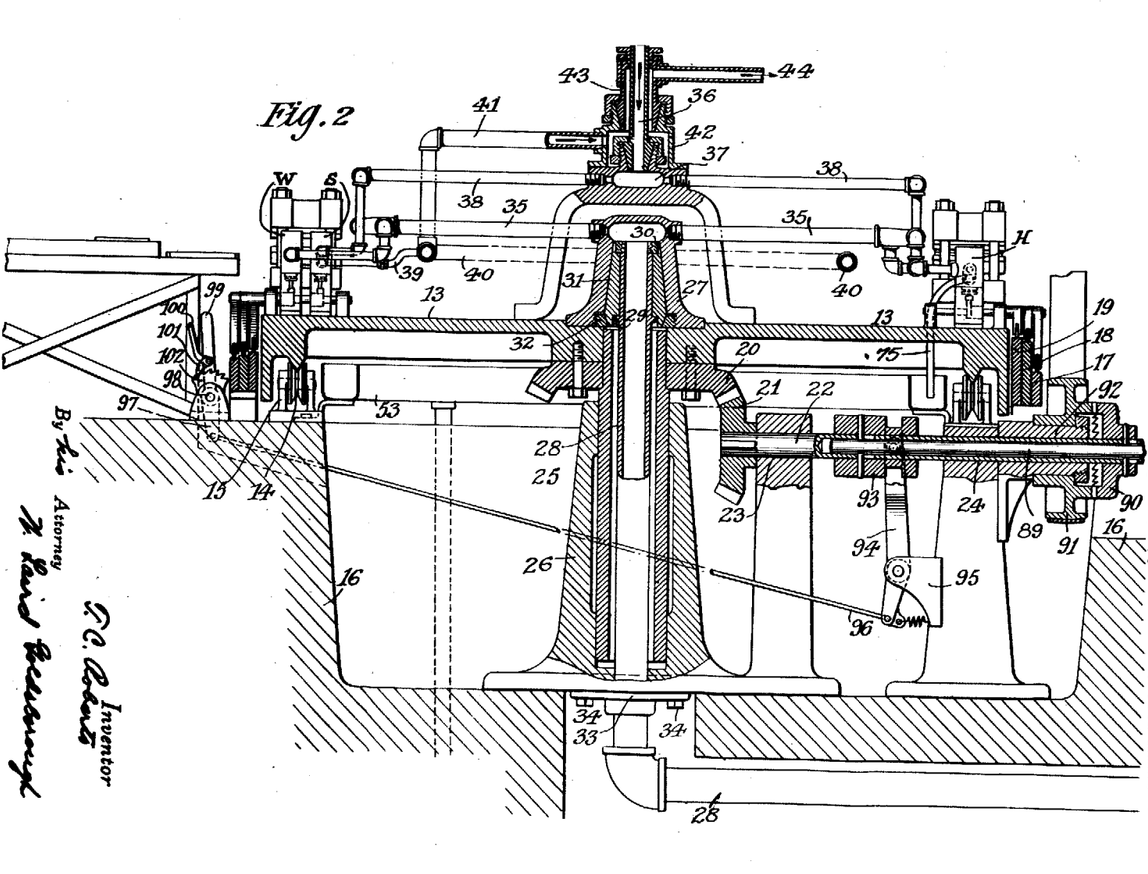
Fig. 2 is a section on unbroken line 2—2 of Fig. 1.

Fixed to the conveyer 13, which is preferably in the form of a turn-table revolving about a vertical axis, is a driven gear 20 meshing with a driving gear 21 secured to the shaft 22 the latter being actuated from any convenient source of power and mounted for rotation in bearings 23 and 24 suitably supported from the base 16. Suitably secured to and projecting downwardly from the conveyer is a hollow shaft 25 provided with a bearing 26 mounted upon the base or foundation 16 and about which the turn-table is adapted to rotate as an axis. Also secured to the turn-table 13 and projecting upwardly therefrom is a distributing nozzle 27 for the main water supply pipe 28. Secured to the water supply pipe 28 by means of the external flange 29 and adjustable nut 30, and interposed between the pipe 28 and the nozzle 27, is a sealing plug 31 whose exterior tapered surface engages with the correspondingly shaped interior surface of the nozzle 27. The lower interior surface of the nozzle is offset and screw-threaded to receive an externally threaded annular nut 32, the inner periphery of which is tapered to engage with the tapered lower end of the plug 31, the construction being such that when the nut 32 is screwed home there is effected a fluid-tight swivelled connection between the nozzle 27 and the main water supply pipe 28, thus enabling the conveyer to rotate about its shaft 25. For the purpose of properly supporting the water supply pipe in its adjusted position, I employ a flange 33 suitably secured, as by bolts 34, to the bottom of the bearing 26.

Extending laterally from the nozzle 27 is a plurality of distributing pipes 35, which not only supply the water for actuating the presses hydraulically but also serve to supply water for the purpose of cooling the same. The connections between these pipes and the presses and the means for controlling the flow of water therethrough will be described in detail hereinafter.

In the pressing of sound records it is necessary at certain stages of the operation to admit a medium to heat the presses to a certain temperature. For this purpose there is provided a main steam admission pipe 36 swivelled to a distributing nozzle 37 which, in the embodiments illustrated, is supported by and fixed to rotate with the conveyer. Suitable distributing pipes 38 are employed to convey the heating medium from the distributing nozzle to the pressing units. Connected to each press is a steam exhaust pipe 39 leading to a header 40, the latter being connected through pipe 41 and swivelled sleeves 42 and 43 with a main steam exhaust pipe 44, it being understood that sleeve 42 partakes of the revolutions of the conveyer 13 and that sleeve 43 is relatively stationary.

From the foregoing it will be readily apparent that the distributing nozzles 27 and 37 and the distributing pipes 35 and 38 move as a unit with the conveyer. The valves which control the admission of the water and steam to the presses are preferably located adjacent to the latter and likewise move as a unit with the pressing units and the traveling conveyer. The construction of the valves and the mechanism for controlling the same, all of which are by way of examples, I will now proceed to describe.

Figure 3:
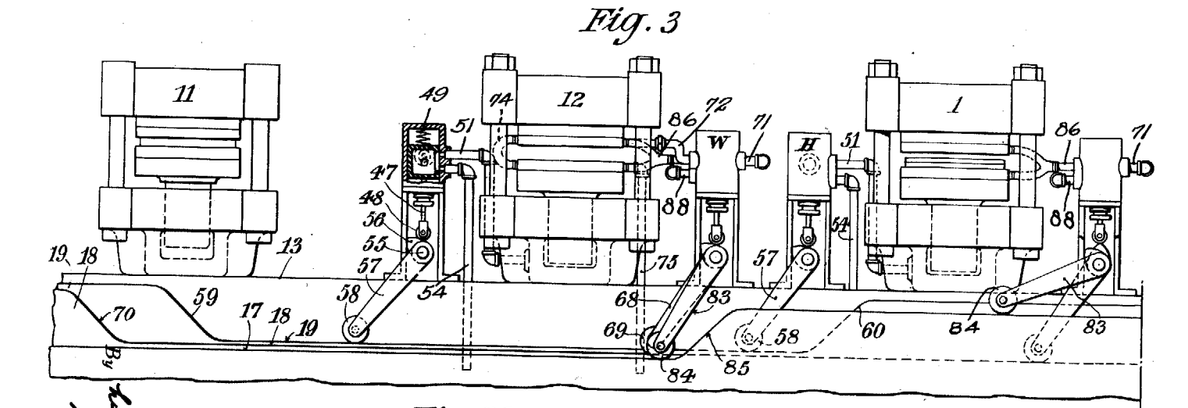
Figs. 3 and 3ª are diagrammatic views illustrating the sequence of operations of a plurality of the pressing units.
Figures 3A, 7:
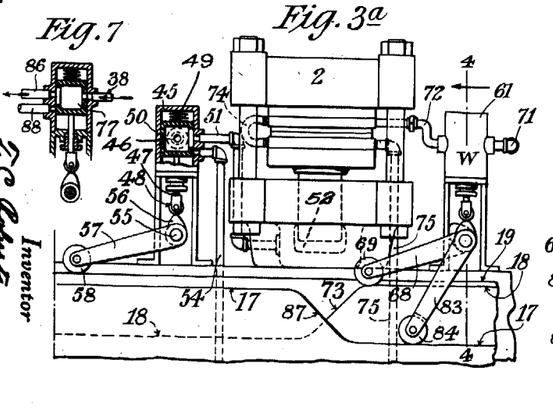
Fig. 7 is section similar to Fig. 6 showing the various parts in a different position.
Figures 4, 5, 6:
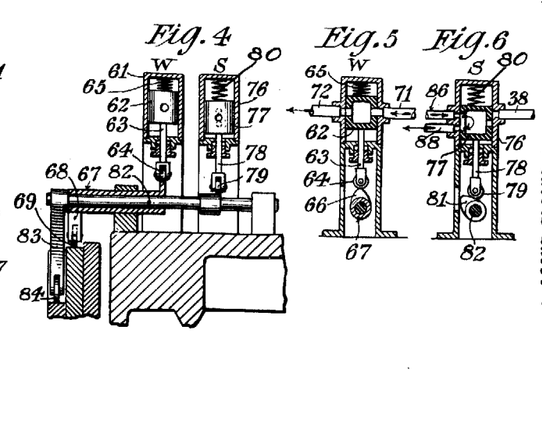
Fig. 4 is a section taken on line 4—4 of Fig. 3ª diagrammatically illustrating the manner in which the valves for controlling the admission and exhaust of the heating and cooling mediums are operated.
Fig. 5 is a section through the valve for controlling the cooling medium taken at right angles to the section thereof in Fig. 4.
Fig. 6 is a similar section of the valve for controlling the heating medium.

Figs. 3 and 3ª illustrate the sequence or stages of operations briefly as follows:— Press 11, assuming that the record-pressing machine has been in operation, is under hydraulic pressure, with the record still contained therein, and with the cooling water still turned on and the steam turned off; press 12 is open for the purpose of removing the finished product with the cooling water, the water under hydraulic pressure and the steam all shut off; press 1 is open with the cooling water and water under pressure turned off and with the steam turned on to enable the press to be heated preparatory to receiving the next charge of material; and press 2 is closed by hydraulic pressure with the steam turned off and the cooling water turned on.

It will be quite apparent from above that the construction, control and operation of, as well as the connections to, the individual pressing units are all the same. Therefore the following description along these lines of one of these units will suffice to convey an understanding of the construction, control and operation of all the units. Adjacent to each press, there are provided an hydraulic valve H, a steam valve S and a cooling water valve W, the constructions of which are illustrated in a more or less diagrammatic way.

Referring first to the construction of the hydraulic valve H (see Figs. 3 to 7 inclusive) the reference numeral 45 indicates the casing, 46 the piston valve, 47 the valve stem passing through a suitable stuffing box and provided with an anti-friction roller 48 on its lower end, and 49 a means, such as a spring, tending to actuate the piston valve in the direction of its normal position to shut off the pressure to the presses. As will be seen from Fig. 3ᵃ when the valve 47 is in its uppermost position communication is established between the pipes 50 and 51 to enable the water to enter the hydraulic chamber 52 of the pressing unit, but when the valve is in its lowermost position communication is established between the pipes 50 and 54 to enable the water under pressure to be exhausted from the chamber 52 to open the press. Located below the hydraulic valve H is a rotatable shaft 55 provided with a heart-shape or two-face cam 56 secured thereto which engages with the anti-friction roller 48 and is actuated to control the flow of water by means of an arm 57 fixed to said shaft and having an anti-friction roller 58 at its outer end, said arm 57 adapted to be moved to release the hydraulic pressure by its anti-friction roller 58 riding down the cam surface 59 on the cam-rail 19. Hydraulic pressure is admitted to the press by the anti-friction roller 58 riding up the cam surface 60, it being understood that the construction is such that the pressure will be relieved at that stage of the operation when it is desired to remove the finished product, and that the pressure will be admitted after the new batch of material has been supplied to the pressing unit.

The valve W and its controlling mechanism for admitting cooling water comprises a casing 61, piston valve 62, valve stem 63, anti-friction roller 64, spring 65, cam 66, shaft 67, arm 68 and anti-friction roller 69, the construction and arrangement of the parts being so similar to the construction and arrangement of the parts of the valve H that no further description is necessary, except to say that when the roller 69 rides down the cam surface 70 on cam-rail 18 communication between the pipe 71 and pipe 72 is broken but that when it rides up the cam surface 73 on cam-rail 18 communication is re-established. It may also be remarked that the cooling water from pipes 72 is admitted to one head of the press, that it is conveyed to the other head by the flexible connection 74 and that it is discharged from the latter by pipe 75 into the trough 53. It will of course be understood that any conventional type of press heads provided with cooling cavities may be employed. In fact, I have illustrated only so much of the pressing units as will enable a complete understanding of my invention, the various details thereof having been omitted. Pipes 50 and 71 are branches of the distributing pipes 35.

The valve S and its mechanism employed for enabling, the admission and discharge of steam or other heating fluid comprises a casing 76, piston valve 77, stem 78, anti-friction roller 79, spring 80, cam 81, shaft 82, arm 83, and anti-friction roller 84 the construction and arrangement of the parts being likewise similar to the construction and arrangement of the parts of valve H, and therefore no detailed description thereof is necessary, except to say that when the roller 84 rides up the inclined surface 85 of the cam-rail 17 the valve S is actuated to establish communication between the distributing pipe 38 and the pipe 86 leading to the pressing unit but that when the roller 84 rides down the incline surface 87 the valve is actuated to shut off the flow of fluid through the distributing pipe 38 and to establish communication between the pipe 86 and the pipe 88 to enable the steam to be exhausted from the press. The levers 57, 68, and 83, it will be understood, can be individually actuated, as for instance, manually, to completely operate the pressing units, thus making possible the operation of a certain part of them, while the support is stationary. All of the presses represent complete pressing units, individually workable at all times and at any position of rotation of the support. During the automatic operation of the valves, one side of each cam 56 engages the roller of its valve-arm. But, in the manual operation, the levers 57, 68 and 83 are swung upwardly away from the cam-track, bringing into operation the other sides of the cams 56. This operation is possible, because the cams 56 are, as above stated, heart-shaped or two-faced.

During the operation of the machine it sometimes becomes necessary to stop the rotation of the conveyer. To accomplish this object the following mechanism is preferably employed. Telescoping with the shaft 22 (see Fig. 2) is a rod 89 which rotates therewith but is movable longitudinally with respect thereto. Fixed to the outer end of the rod 89 is a clutch member 90 (see Fig. 1) which is adapted to engage pulley 91, the latter being rotatably mounted upon a bearing 92 concentric to the shaft 22 and rod 89. To the inner end of the rod 89 is secured a shifting or sliding collar 93 adapted to be actuated to cause the clutch member 90 to engage or disengage the pulley 91. The mechanism for actuating this shift collar 93 to start and stop the machine comprises a spring pressed lever 94 pivoted to the bracket 95, the forked end of which engages with the groove in the collar 93 and the other end of which is connected to one end of a rod 96. The other end of this rod 96 is connected to an arm 97 rigidly mounted upon a rock shaft 98. To this rock-shaft adjacent to the loading operator is rigidly secured an actuating arm 99 provided with a lever 100 and a pawl 101, the latter adapted to operate over a rack 102 as will be understood. Adjacent the unloading operator there is provided a second actuating arm 103 (see Fig. 1) likewise rigidly mounted upon the rock shaft 98. This arm 103 is also provided with an operating lever 104. The levers 100 and 104 are rigidly connected to the rod 105 the respective ends of which are pivotally mounted in the actuating arms 99 and 103 from which it will be seen that either the loading or the unloading operator may shift the collar 93 at will to start and stop the machine. In order that the momentum of the machine may be overcome instantly in case of an emergency the following mechanism is employed. Pivotally mounted at 106 (see Fig. 1) to any convenient support is a bell-crank lever one arm 107 of which is normally held by spring 108 against the protruding end of the rod 89. The other arm 109 is pivotally connected to one end of a link 110 the other end of the latter being pivotally connected to one arm 111 of a second bell-crank, the other arm 112 of which constitutes a brake-shoe adapted when the clutch 90 is thrown out of engagement with the driving pulley 91, to engage the outer periphery of the traveling conveyer. From the foregoing it will be readily apparent that a movement in one direction of either arm 99 or 103 will serve to start the operation of the machine and that a movement of either in the other direction will serve not only to disconnect the record-pressing machine from its source of power but will also instantly apply the brake shoe 112 to stop the movement of the conveyer due to its momentum.

In Figs. 1 and 2 there is diagrammatically illustrated not only the relative position 113 and 114 of the loading and unloading operators but also a heating table 115, top and bottom matrices 116 and 117, top and bottom pressing plates 118 and 119, knocking block 120 and finished record 121. It may be stated in this connection that I make no claims herein to the various parts referred to in this paragraph as they are merely illustrated to show how my invention may be carried out in practice. It is therefore to be expressly understood that any form of steam table, pressing plates and matrices may be employed in connection with my invention.

In Figs. 8, 9, 10 and 11 is illustrated a modified form of the invention in which the pressing units are opened and closed mechanically as distinguished from being controlled hydraulically. To that end there is provided a driving gear 122 mounted upon a driving shaft 123 the latter being provided with suitable journals 124 and 125. Gear 122 meshes with a driven gear 126 fixed to a hollow shaft 127. Encircling this shaft but fixed to a suitable support resting upon the base of the machine is a sun gear 128 meshing with a plurality of planet gears 129 fixed upon shafts 130 which are carried in journals 131 and 132 provided on the underside of the traveling conveyer and held against longitudinal movement by the thrust collar 133 and the shoulder of the gears 129. Each shaft 130 is provided with two bevel gears 134 and 135 facing each other and carried by a shaft 136 telescoping with shaft 130. Shaft 136 is not only arranged to rotate with shaft 130 but is capable of relative longitudinal movement with respect thereto so that one or the other of gears 134 and 135 are adapted to mesh with a gear 137 although normally they are both in neutral or unmeshed position. To accomplish this relative movement of the gears 134 and 135 with respect to shaft 130 and gear 137 the following construction is preferably employed. The central perforations of gears 134 and 135 are sufficiently large to enable them to slide over shaft 130 and are supported from the inner shaft 136 by means of pins 138 and 139 projecting through elongated slots 140 and 141, the said gears being obviously limited in their movements by their engagement with the gear 137. In alignment with the hollow shaft 130 is a bracket 142 which carries a stub-shaft 143 provided with studs 144 projecting outwardly into slots 145 in the bracket to prevent the rotation of said stub-shaft so that the anti-friction roller 146 carried by the protruding end of the stub-shaft always rotates about a vertical axis. Located between a collar 147 fixed to the shaft 130 and the shoulder of gear 134 is a spring 148 which maintains the outer end of the inner shaft 136 in contact with the inner end of shaft 143, thereby maintaining the anti-friction roller 146 in contact with a stationary cam rail 149. As before stated the gears 134 and 135 are normally maintained in neutral or unmeshed position with respect to gear 137, but when the traveling conveyer is rotated the anti-friction roller ultimately arrives at the depression 150 in the cam rail 149 (see Fig. 9), thus enabling the roller 146, shaft 144, shaft 136 and gears 134 and 135 to move outwardly thereby causing the inner gear 134 to mesh with gear 137 to rotate the shaft 151 of the latter, it being understood from the sun and planetary gear arrangement that the gears 134 and 135 are always rotating during the movement of the conveyer. The shaft 151 is provided with a feed screw 152 (see Fig. 11) in engagement with threads on the lower head of the press from which it will be understood that a rotation of the gear 137 with its supporting shaft 151 in the fashion just described imparts a downward movement of the lower head of the press thereby opening the same to enable the finished product to be removed therefrom. The continued rotation of the conveyer cams the anti-friction roller 146 out of the depression 150 thereby bringing the gears 134 and 135 again into neutral position. The further rotation thereafter brings the anti-friction roller 146 into contact with the inwardly projecting cam surface 153 provided on the stationary cam rail 149 to cause gear 135 to mesh with gear 137 for the purpose of rotating the latter to close the press, it being understood that the amount of movement imparted to the gears will depend upon the length of the high point of the cam 153. In order to take care of any undue movement of the lower head of the press and also in order that the parts need not be constructed with any great degree of accuracy the upper head of the press is relatively movable under the tension of the springs 154.

Figure 8:
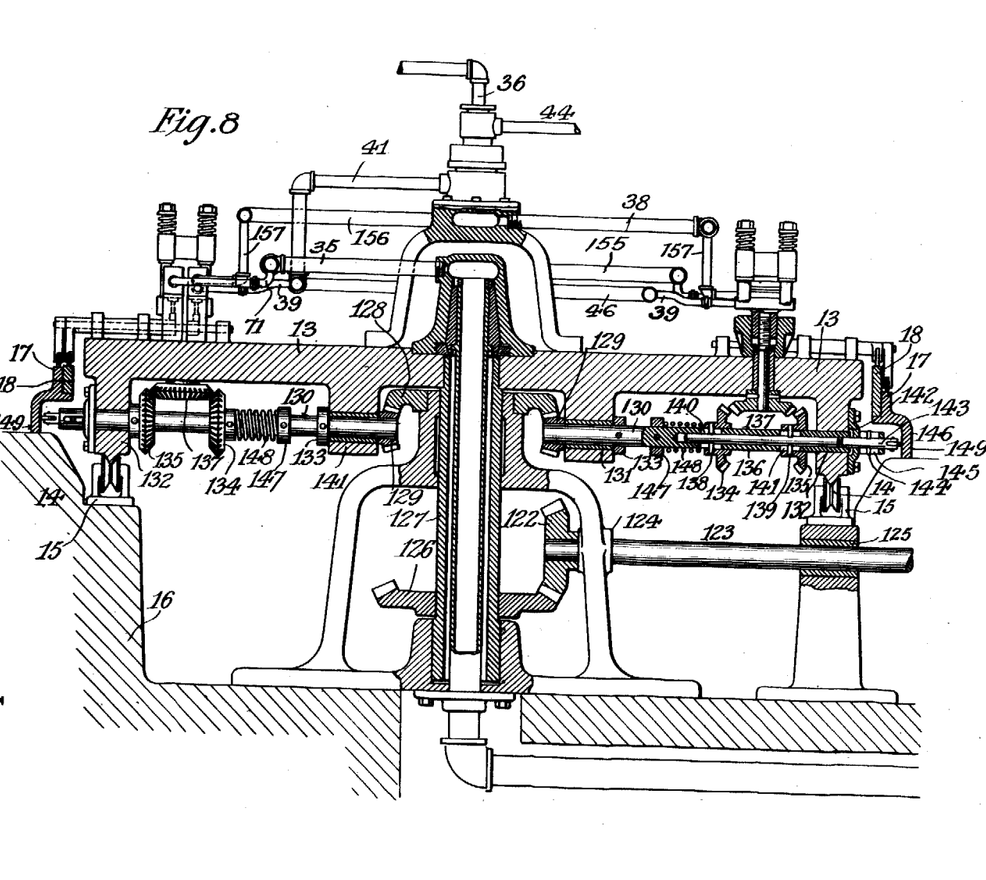
Fig. 8 is a vertical transverse section of a modified form of the invention.
Figures 9, 10, 11:
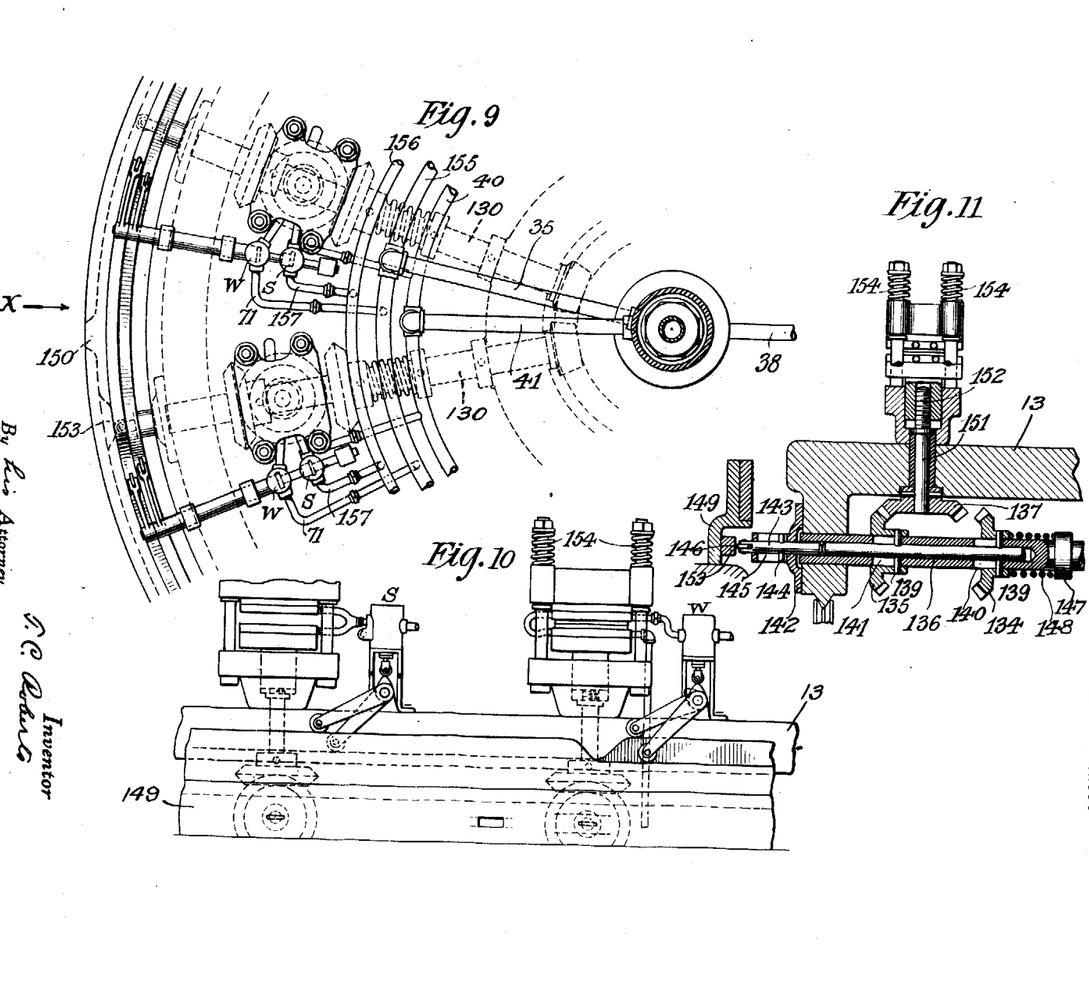
Fig. 9 is a top plan view of a portion of this modified form.
Fig. 10 is a front view of this modified form looking in the direction of the arrow "X" of Fig. 9.
Fig. 11 is a detailed view.

Attention is called, in this connection, to the modified construction of the water and steam inlet and outlet connections clearly illustrated in Figs. 8 and 9. In this instance there is only one distributing pipe, the latter leading to a header 155 from which cooling water is conducted to the valves W by the branch pipes 71 previously described. There is also only one distributing pipe 38 for the heating fluid, the latter leading to a header 156 from which said fluid is conducted to the valves S by means of the branch pipes 157.

Those parts of Figs. 8 to 11 inclusive, not specifically referred to herein, are similar in every respect to the corresponding parts illustrated and described in connection with Figs. 1 to 7 inclusive. Those parts therefore having previously been clearly elucidated any further reference thereto is omitted to avoid prolixity of description.

Figures 12, 13:
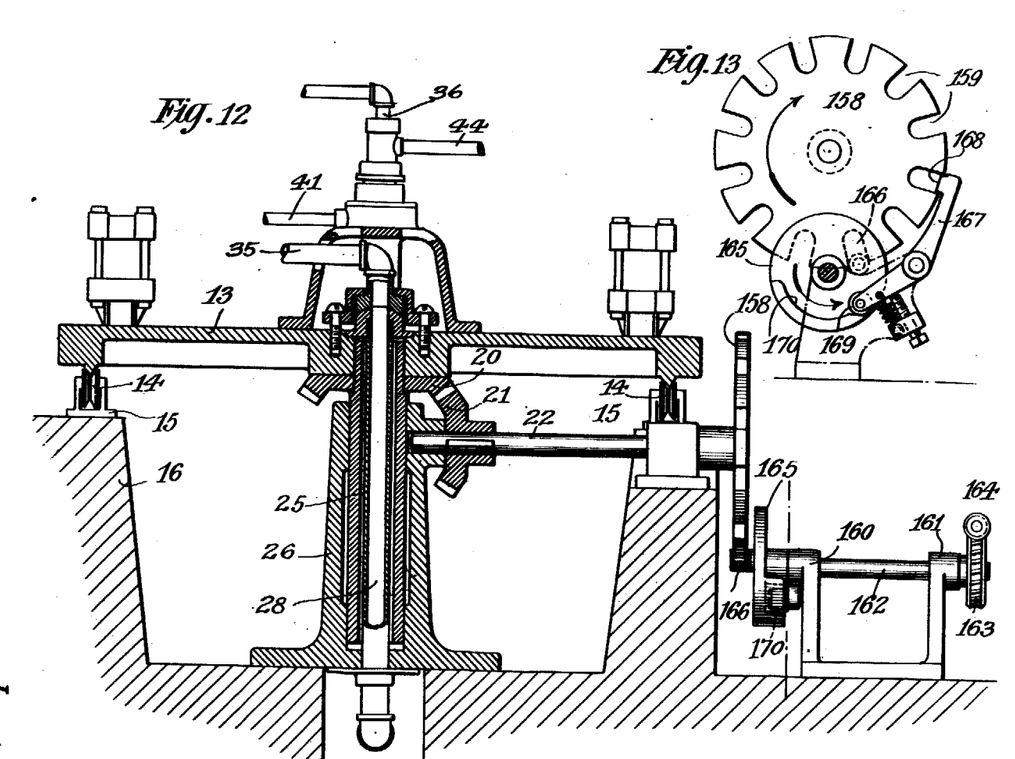
Fig. 12 is a modified form of the construction illustrated in Figs. 1 to 7 inclusive, showing mechanism for imparting an intermittent or step-by-step rotation to the conveyer.
Fig. 13 is a detailed view of the modification illustrated in Fig. 12.

In Figs. 12 and 13 is illustrated a further modified form of the construction illustrated in Figs. 1 to 7 inclusive. In many instances it has been found desirable, for many reasons, to impart, in a device of this character, an intermittent or step-by-step movement to the conveyer. Of the many constructions that may be employed for the purpose I have selected for illustration the one shown in said Figs. 12 and 13. However it is desirable that the intermittent means employed should be such as to cause each actuation of the intermittent means to move the traveling conveyer from one station to its next succeeding station. This mechanism in detail comprises a driven gear 20 and a driving gear 21 preferably of the same pitch diameter, the latter being mounted upon the driving shaft 22, the outer end of which is provided with a star wheel 158 provided with notches 159, the number of which preferably corresponds to the number of pressing units employed on the traveling conveyer, in this instance twelve. Mounted in suitable journals 160 and 161 is a counter-shaft 162 one end of which is connected through worm wheel 163 and worm gear 164 to any suitable source of power. The other end of this counter-shaft is provided with a disc member 165 provided on one side with an eccentrically located stud 166 adapted to engage one of the notches 159 and move the star wheel one-twelfth of a revolution as will be understood by a casual inspection of Fig. 13. Due to its weight the conveyer acquires considerable momentum once it has been started. To overcome this momentum after the star wheel has been moved through an angular distance of thirty degrees so that the next succeeding notch will be in a position to receive the stud 166 I employ the pivotally mounted spring-pressed stop lever 167 provided on one end with a projection 168, preferably slightly tapered or wedge-shaped, adapted to engage one of the notches in the periphery of the star wheel. The other end of this lever is provided with a cam engaging surface such as an anti-friction roller 169 which rides over the cam 170, upon each rotation of the disc member 165 the construction being such that just as the stud 166 enters one of the notches 159 to rotate the star wheel the cam 170 engages the anti-friction roller 169 and moves the stop-lever 167 in a clockwise direction about its pivotal point, thereby withdrawing the wedge-shaped projection 168 from the notch with which it is engaged. The roller 169 rides off of the cam just as the stud 166 is leaving the notch with which it is engaged, that is, after the star wheel has been moved an angular distance of thirty degrees, thereby enabling the stop lever, under the force of the spring 171, to move in a counter-clockwise direction so that the wedge-shaped projection thereon engages the next succeeding notch.

Figure 14:
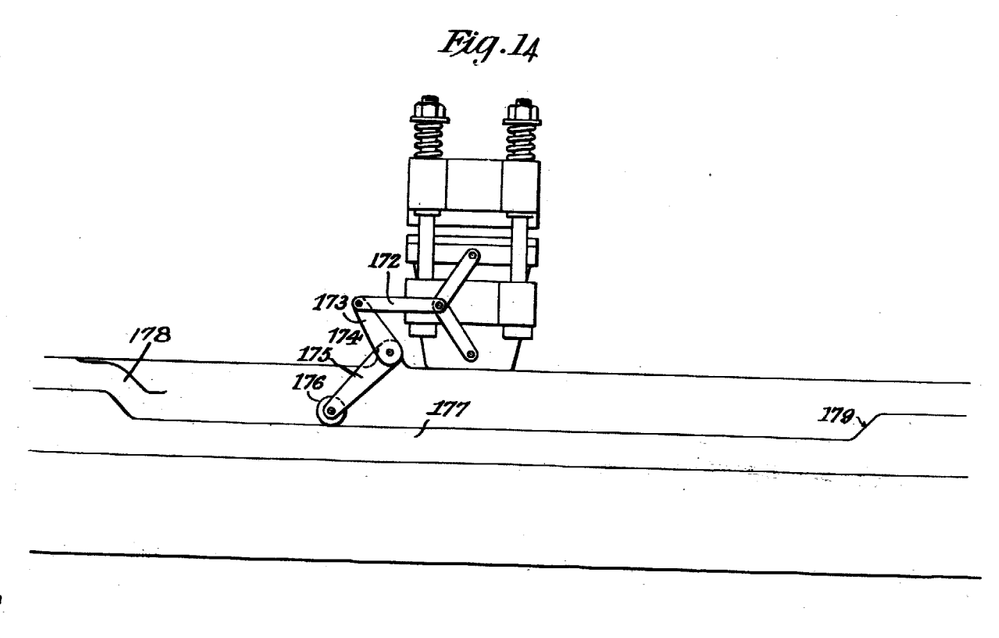
Fig. 14 is a diagrammatic view of another modified form.

In Fig. 14 I have illustrated another mechanical means of a modified form for opening and closing the presses consisting of a toggle lever construction, the link 172 of which is connected to an arm 173 fixed to a shaft 174. To the latter is fixed an actuating arm 175 quite similar to the arm 57 illustrated and described in connection with Figs. 1 to 7. The arm 175 is provided with a cam roller 176 which travels over a race-way 177 provided with a receding slot 178, which provides a positive means for opening the press and is also provided with an ascending surface 179, over which the roller 176 must pass to close the press. This toggle construction is also diagrammatically shown but is embodied herein for the purpose of further elucidating the principles of my invention.

From the foregoing it will be seen that I have devised a record-pressing machine that is capable of turning out a great number of records as compared to machines now in vogue. In the drawings I have illustrated the use of twelve pressing units, but it will be readily apparent that any desired number may be employed. It is however to be expressly understood that I do not limit myself to the exact details of construction or to the specific embodiments of the invention herein illustrated and described, as many changes may be made in points of detail and other embodiments resorted to without deviating from the true spirit and scope of my invention as defined by the appended claims. While this invention has been particularly described as adapted for making sound records, it should be understood that it is also suitable for molding articles of any kind. And it should be further understood that the press may be used for pressing other than thermoplastic material.

What I claim is:

1. A pressing machine including, in combination, a movable support, a plurality of presses carried by the support, and means for successively effecting various treatments of the material in the presses, said means being adapted to be actuated by the movement of the support, and also adapted to be individually actuated independently of such movement and independently of each other.

2. A pressing machine including, in combination, a movable support, a plurality of presses carried by the support, and means for successively opening, heating, closing, and cooling the presses, said means being adapted to be actuated by the movement of the support, and also adapted to have individual and independent actuation free of such movement.

3. A pressing machine including, in combination, a movable support, a plurality of presses carried by the support, and means for successively effecting various treatments of the material in the presses, said means being adapted to be actuated by the movement of the support, and also adapted to have individual and independent actuation, free of such movement.

4. An apparatus for pressing articles, including a movable support, a plurality of pressing units mounted thereon, means for actuating the pressing units, and means operable independently of said means for periodically cooling the pressing units.

5. An apparatus for pressing articles, including a movable support, a plurality of pressing units mounted thereon, and each with an independently operable heating supply, and means for periodically admitting the supply to the presses successively.

6. The invention as in claim 4, further characterized by each of said pressing units having an independent heating supply.

7. The invention as in claim 6, including means for periodically admitting the heating supply successively to the presses.

8. A pressing machine comprising a movable support, a plurality of complete and independently operable pressing units carried by the support, and means automatically controlled by the movement of said support for successively effecting the opening, heating, closing and cooling of the pressing units.

9. A pressing machine, comprising a movable support, a plurality of complete and independently operable pressing units, and mechanism automatically controlled by the movement of the support for simultaneously and successively effecting the opening, heating, closing and cooling of the pressing units, said mechanism comprising means for correlating the successive operations of the machine.

10. A machine for making articles from suitable material, comprising a movable support, in combination with a plurality of automatic means controlled by the movement of the support for effecting successive treatments of such material in the manufacture of articles therefrom, each of said means being independently operable but correlated with every other means.

11. A machine for making articles from plastic or other suitable material, comprising a movable support, a plurality of units carried by said support for receiving the material, automatic means for operating the units to press the material contained therein, and mechanism operable independently of said automatic means adapted to be actuated by the movement of the support for effecting a heating and a cooling treatment of the material, said mechanism comprising means for correlating these treatments so that one of them will be prolonged as compared to the other.

12. A multiple pressing machine comprising, in combination, a support, and a plurality of presses carried by the support, together with automatic means for successively opening, heating, closing, and cooling said presses, said heating and cooling means including a platen in each press and means to automatically pass both heating and cooling media successively therethrough while the press is in closed position.

13. The invention as in claim 12, further characterized by all of said means being actuated by the movement of the support.

14. A multiple pressing machine comprising, in combination, a revolving support and a plurality of presses carried by the support, together with individually and independently operable means for successively opening, heating, closing, and cooling said presses, said means being actuated by the movement of the support and said heating and cooling being effected with the aid of fluid media indirectly applied.

15. A machine for making articles from suitable material, comprising a movable support and a plurality of individual presses carried by the support, together with independently operable and individual mechanisms actuated by the movement of the support for effecting the heating and cooling treatments of the material, in each of said presses, each of said mechanisms being arranged so that one of these treatments will be prolonged as compared to the other treatment.

16. An apparatus for pressing articles comprising a movable support, a plurality of pressing units carried by the support for pressing plastic material, a plurality of means associated with each of the pressing units for effecting various treatments of the material, and a plurality of means associated with the movable support and operable independently to cause the actuation of the respective plurality of means associated with the several pressing units, as the support is moved.

17. An apparatus for pressing articles comprising a movable support, a plurality of pressing units carried by the support for pressing plastic material, means associated with each of the pressing units for opening, heating, closing, and cooling said units, and a plurality of means associated with the movable support and operable independently to cause the actuation of the respective means associated with the several pressing units, as the support is moved.

18. An apparatus for pressing articles, comprising a movable support, a plurality of pressing units carried by the support for pressing plastic material, means associated with each of the pressing units for opening and closing them, other means associated with each of the pressing units for effecting temperature changes therein, and still other means associated with the movable support and operable independently to cause the actuation of the first-named means and the second-named means independently of each other, as the support is moved.

19. An apparatus for pressing articles, comprising a revolvable support, a plurality of identical independent pressing units mounted radially in spaced relation upon the support, means associated with each of the pressing units for opening and closing— and other means for heating and cooling the pressing units, relatively movable means independently associated with each of the respective pressing units for controlling the first- and second-named means operable independently of each other, and means associated with the support and adapted to cause the actuation of the relatively movable means in predetermined sequence and timed relation, as the support is revolved.

20. An apparatus for pressing articles, comprising a revolvable support, a plurality of identical independent pressing units mounted radially in spaced relation upon the support, means associated with each of the pressing units for opening and closing— and other means for heating and cooling— the pressing units, relatively movable means independently associated with each of the respective pressing units for controlling the first- and second-named means independent of each other, and annular cam tracks associated with the support and adapted to cause the actuation of the relatively movable means in predetermined sequence and timed relation as the support is revolved.

21. An apparatus for pressing articles, comprising a revolvable support, a plurality of identical and independently operable pressing units mounted radially in spaced relation upon the support, each of said pressing units comprising relatively movable platens, fluid-pressure means for moving said platens into and out of pressing relation, means for admitting a heating medium to said pressing units, means for admitting a cooling medium to said pressing units, and means occupying fixed positions relatively to said support and adapted to cause the independent actuation of said fluid-pressure means, said heating medium admission means, and said cooling medium admission means, as the support is revolved.

22. An apparatus for pressing articles, comprising a revolvable support, a plurality of identical independently-mounted and independently operable pressing units carried by the support, each of the pressing units comprising a base secured to the support, relatively-movable platens supported by the base, pressure means for moving the platens into and out of pressing relation, and means for effecting temperature changes in the platens, and means occupying fixed positions relatively to said support and adapted to cause the independent actuation of said pressure means and said temperature-changing means as the support is revolved.

23. An apparatus for pressing articles, comprising an annular support, a plurality of identical and independently operable pressing units mounted radially in spaced relation upon the support and adjacent the outer periphery thereof, each of said pressing units comprising relatively movable platens, pressure means for moving the platens into and out of pressing relation, means including passageways for admitting heating and cooling media successively to the platens, a heating-medium supply manifold, a cooling-medium supply manifold, connection means between said manifolds and said passageways, and individual means for independently operating said pressure means and said heating and cooling media admission means of the several pressing units.

24. An apparatus for pressing articles, comprising an annular support, a plurality of identical and independently operable pressing units mounted radially in spaced relation upon the support and adjacent the outer periphery thereof, each of said pressing units comprising relatively movable platens, pressure means for moving the platens into and out of pressing relation, means including passageways for admitting a cooling medium to said platens, a cooling medium supply manifold, connection means between said cooling medium supply manifold and said passageways and means associated with each of the pressing units adapted to operate said pressure means and said cooling medium admission means independently of each other.

25. An apparatus for pressing articles, comprising an annular support, a plurality of identical and independently operable pressing units mounted radially in spaced relation upon the support and adjacent the outer periphery thereof, each of which units comprises relatively-movable platens, fluid pressure means including passageways for moving said platens into and out of pressing relation, means including passageways for admitting a heating medium to said platens, other means including passageways for admitting a cooling medium to said platens, a fluid-pressure supply manifold, connection means between said manifold and the fluid-pressure passageways of the respective pressing units, a heating-medium supply manifold, connection means between said heating-medium supply manifold and the heating-medium passageways of the respective pressing units, a cooling-medium supply manifold, connection means between said cooling-medium supply manifold and the cooling-medium passageways of the respective pressing units, and means individual to each pressing unit for independently operating said pressure means and said heating and cooling medium admission means of the several pressing units.

26. The invention as in claim 21, further characterized by means for revolving said support, and means occupying relatively fixed positions and adapted to automatically and independently actuate said individual means of the respective pressing units as the support is revolved.

27. An apparatus for pressing articles, comprising a central distributing section including a stationary fluid-pressure supply conduit, a stationary heating-fluid supply conduit and a stationary cooling-fluid supply conduit, a revolvable support annularly surrounding said central distributing section, a plurality of distributing manifolds rotatable with said support and in rotative communication with the respective stationary supply conduits, a plurality of identical and independently operable pressing units mounted radially in spaced relation upon said support, each of which units comprises relatively movable platens, fluid-pressure means including passageways for moving said platens into and out of pressing relation, connection means between said fluid-pressure passageways and the fluid-pressure distributing manifold, means including passageways for admitting heating-fluid to said platens, connection means between said heating-fluid passageways and the heating-fluid distributing manifold, means including passageways for admitting heating fluid to said platens, and connection means between said cooling-fluid passageways and the cooling-fluid distributing manifold, and means occupying relatively fixed positions and adapted to automatically and independently actuate said fluid-pressure means, said heating-fluid admission means and said cooling-fluid admission means, as the support is revolved.

28. An apparatus for pressing articles, comprising a revolvable support, a plurality of independently operable pressing units mounted radially in spaced relation upon the support, a charging station, a discharging station spaced therefrom, driving means adapted to rotate the support to bring said pressing units successively into relation with the charging and discharging stations, means for operatively connecting and disconnecting said driving means, and means at each of said stations for operating said connecting and disconnecting means.

29. An apparatus for pressing articles, comprising a revolvable support, a plurality of independently operable pressing units mounted radially in spaced relation upon the support, a charging station, a discharging station spaced therefrom, driving means adapted to rotate the support to bring said pressing units successively into relation with the charging and discharging stations, means for operatively connecting and disconnecting said driving means, and stop means operatively connected to the said connecting and disconnecting means and adapted to be operatively disengaged and engaged with said support as said means is connected and disconnected.

30. An apparatus for pressing articles, comprising a revolvable support, a plurality of independently operable pressing units mounted radially in spaced relation upon the support, a charging station, a discharging station spaced therefrom, driving means adapted to rotate the support to bring said pressing units successively into relation with the charging and discharging stations, a clutch for operatively connecting and disconnecting said driving means, and a brake for said support adapted to be made respectively inoperative and operative as said clutch is connected and disconnected.

31. An apparatus for pressing articles, including a movable support, a plurality of pressing units mounted thereon, means for actuating the pressing units, and separate means operable independently of the said means for periodically cooling the pressing units.

32. An apparatus for pressing articles, including a movable support, a plurality of pressing units mounted thereon, means for actuating the pressing units, and separate means operable independently of the said means and independently of each other for periodically and intermittently heating and cooling the pressing units.

33. An apparatus for pressing articles, including a movable support, a plurality of pressing units mounted thereon and provided with platens, means for cooling the platens, including cooling fluid-admission means, and means controlling the admission adapted to be actuated in predetermined timed relation with the opening and closing action of the pressing units, but independently of such action.

34. An apparatus for pressing articles, including a movable support, a plurality of pressing units mounted thereon and provided with platens, means for cooling the platens, including cooling fluid-admission means, and means controlling the admission adapted to have opening and closing movement distinct from the opening and closing movement of the pressing units.

35. An apparatus for pressing articles, including a movable support, a plurality of pressing units mounted thereon and provided with platens, means for cooling the platens, including cooling fluid-admission and discharge means, and means controlling the admission and discharge adapted to have opening and closing movement distinct from the opening and closing movement of the pressing units.

36. A multiple press for pressing thermoplastic material including a plurality of pressing units, a traveling support for said pressing units adapted to move the units in succession to a charging station, and means operated as an incident to the movement of the units for cooling and opening the presses as the charging station is approached, and heating and closing the presses at the charging station.

37. A pressing machine comprising, in combination, a conveyor, a plurality of presses carried by the conveyor, and means actuated by the movement of the conveyor for successively opening, heating, closing, and cooling said presses, the said means being independently operable.

38. A pressing machine comprising, in combination, a revolvable conveyor, a plurality of presses carried by the conveyor; and independently operable means actuated by the movement of the conveyor for simultaneously effecting successive treatments of the material in said presses.

39. A pressing machine comprising a conveyor, and a plurality of units carried by said conveyor for pressing material, in combination with independently operable means controlled during the movement of the conveyor for correlating successive operations of the different units.

40. A pressing machine comprising a conveyor and a plurality of pressing units provided with material and carried by said conveyor, in combination with independently operable means automatically controlled during the movement of the conveyor for simultaneously effecting successive operations of the material.

41. A pressing machine comprising a conveyor and a plurality of pressing units carried by said conveyor and containing material to be pressed, in combination with independently operable means controlled by the movement of the conveyor for simultaneously effecting a plurality of treatments of the material in said units.

42. A pressing machine for thermoplastic material, comprising a conveyor in combination with independently operable automatic means for effecting successive treatments of the material as required in the manufacture thereof.

43. A machine for making articles of thermoplastic material, comprising a conveyor, in combination with independently operable automatic means for continuously and simultaneously effecting successive treatments required of said material in the manufacture of articles therefrom.

44. A machine for making articles from suitable material including a conveyor in combination with independently operable automatic mechanisms for simultaneously effecting successive treatments required of said material in the manufacture of articles therefrom, said mechanisms including means for correlating the various treatments.

45. In a multiple pressing machine, valve mechanism adapted to be actuated by the movement of the machine for controlling the admission and discharge of hydraulic power used to actuate each pressing unit in proper synchronism with its various operations, and stationary means for actuating the valve mechanism.

46. In an apparatus for making pressed articles, the combination of a revolving conveyor, pressing units mounted on the conveyor, mechanism for controlling the admission and discharge of the temperature-changing media to said pressing units, a cam-track having a plurality of projections, and a cam-rod, there being relative movement between said cam-track and cam-rod, said cam-rod being adapted to actuate said mechanism by the aid of said cam-track projections.

47. In an apparatus for making pressed articles, the combination of a revolving conveyor, pressing units mounted on the conveyor, mechanism for controlling the admission and discharge of temperature-changing media to said pressing units, in proper synchronism with its various operations, a cam-track having a plurality of projections, and a cam-rod, there being relative movement between said cam-track and cam-rod, said cam-rod being adapted to actuate said mechanism by the aid of said cam-track projections.

48. The invention as in claim 46, further characterized by the cam-rod having a roller attached to its track-engaging end.

49. In a multiple pressing machine, the combination of a revolving conveyor, identical pressing units mounted on the conveyor, mechanism for controlling the admission and discharge of a power medium to said pressing units, a cam-rail having a plurality of projections, a cam-rod having a roller attached to its track-engaging end, there being relative movement between said cam-track and cam-rod, said cam-rod being adapted to actuate said mechanism by the aid of said cam-track projections.

50. In an apparatus for making pressed articles, the combination of a revolving conveyor, pressing units mounted on the conveyor, mechanism for controlling the admission and discharge of temperature-changing media to said pressing units, a cam-track having a plurality of projections, and a cam-rod, there being relative movement, actuated by the movement of the conveyor, between said cam-track and cam-rod, said cam-rod being adapted to actuate said mechanism by the aid of said cam-track projections.

51. The invention as in claim 49, further characterized by controlling said admission and discharge of the power medium in proper synchronism with the various operations of the pressing units.

In testimony whereof, I affix my signature.

THEODORE C. ROBERTS.

combination with independently operable automatic mechanisms for simultaneously effecting successive treatments required of said material in the manufacture of articles therefrom, said mechanisms including means for correlating the various treatments.

45. In a multiple pressing machine, valve mechanism adapted to be actuated by the movement of the machine for controlling the admission and discharge of hydraulic power used to actuate each pressing unit in proper synchronism with its various operations, and stationary means for actuating the valve mechanism.

46. In an apparatus for making pressed articles, the combination of a revolving conveyor, pressing units mounted on the conveyor, mechanism for controlling the admission and discharge of the temperature-changing media to said pressing units, a cam-track having a plurality of projections, and a cam-rod, there being relative movement between said cam-track and cam-rod, said cam-rod being adapted to actuate said mechanism by the aid of said cam-track projections.

47. In an apparatus for making pressed articles, the combination of a revolving conveyor, pressing units mounted on the conveyor, mechanism for controlling the admission and discharge of temperature-changing media to said pressing units, in proper synchronism with its various operations, a cam-track having a plurality of projections, and a cam-rod, there being relative movement between said cam-track and cam-rod, said cam-rod being adapted to actuate said mechanism by the aid of said cam-track projections.

48. The invention as in claim 46, further characterized by the cam-rod having a roller attached to its track-engaging end.

49. In a multiple pressing machine, the combination of a revolving conveyor, identical pressing units mounted on the conveyor, mechanism for controlling the admission and discharge of a power medium to said pressing units, a cam-rail having a plurality of projections, a cam-rod having a roller attached to its track-engaging end, there being relative movement between said cam-track and cam-rod, said cam-rod being adapted to actuate said mechanism by the aid of said cam-track projections.

50. In an apparatus for making pressed articles, the combination of a revolving conveyor, pressing units mounted on the conveyor, mechanism for controlling the admission and discharge of temperature-changing media to said pressing units, a cam-track having a plurality of projections, and a cam-rod, there being relative movement, actuated by the movement of the conveyor, between said cam-track and cam-rod, said cam-rod being adapted to actuate said mechanism by the aid of said cam-track projections.

51. The invention as in claim 49, further characterized by controlling said admission and discharge of the power medium in proper synchronism with the various operations of the pressing units.

In testimony whereof, I affix my signature.

THEODORE C. ROBERTS.

Certificate of Correction.

It is hereby certified that in Letters Patent No. 1,537,697, granted May 12, 1925, upon the application of Theodore C. Roberts, of Bridgeport, Connecticut, for an improvement in "Apparatus for Molding Articles," errors appear in the printed specification requiring correction as follows: Page 5, line 72, strike out the word "traveling"; page 8, line 101, claim 27, for the word "heating" read *cooling;* and that the said Letters Patent should be read with these corrections therein that the same may conform to the record of the case in the Patent Office.

Signed and sealed this 16th day of June, A. D. 1925.

[SEAL.]

KARL FENNING,
*Acting Commissioner of Patents.*

Certificate of Correction.

It is hereby certified that in Letters Patent No. 1,537,697, granted May 12, 1925, upon the application of Theodore C. Roberts, of Bridgeport, Connecticut, for an improvement in "Apparatus for Molding Articles," errors appear in the printed specification requiring correction as follows: Page 5, line 72, strike out the word "traveling"; page 8, line 101, claim 27, for the word "heating" read *cooling;* and that the said Letters Patent should be read with these corrections therein that the same may conform to the record of the case in the Patent Office.

Signed and sealed this 16th day of June, A. D. 1925.

[SEAL.]

KARL FENNING,
*Acting Commissioner of Patents.*